United States Patent Office 3,054,480
Patented Sept. 18, 1962

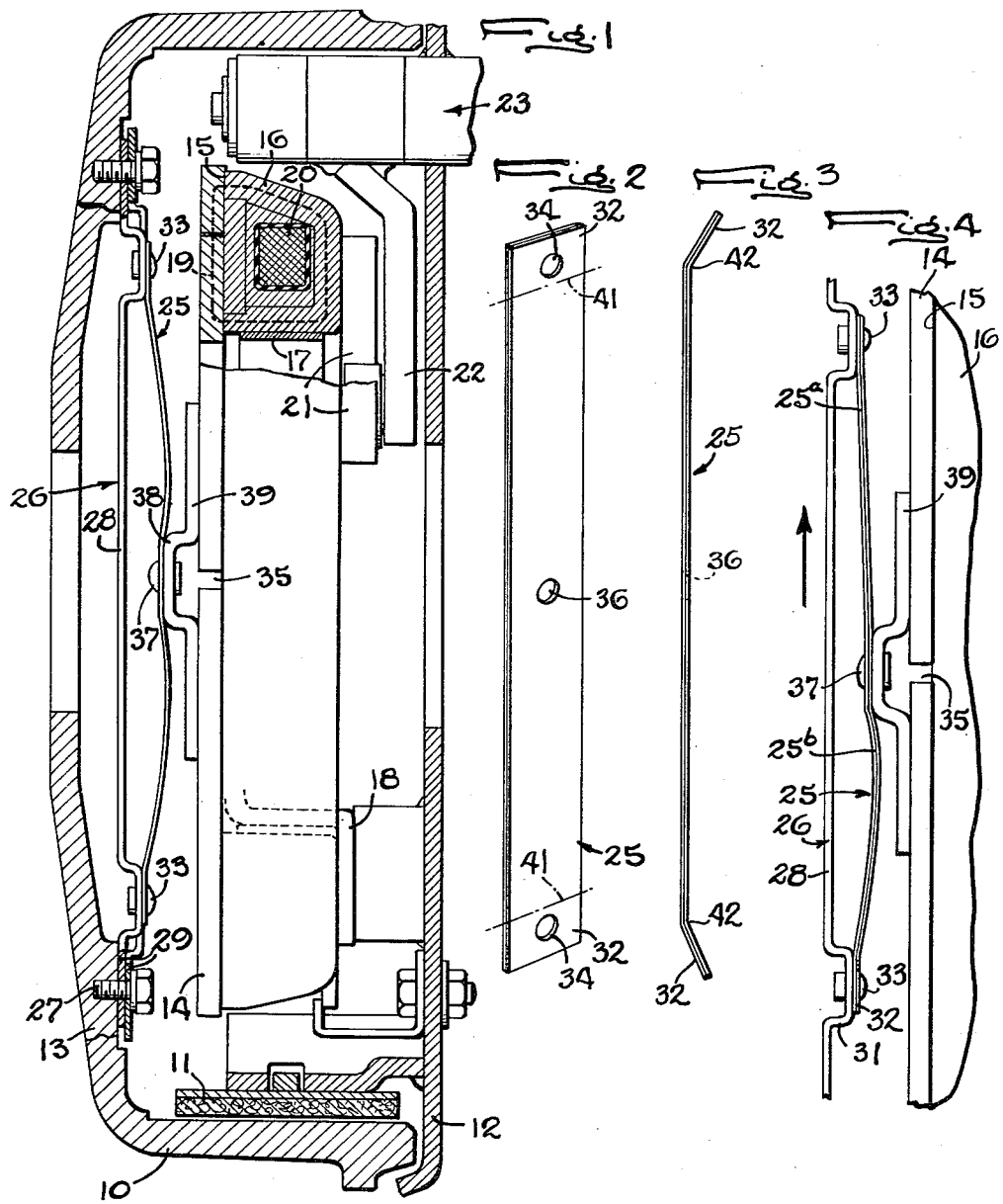

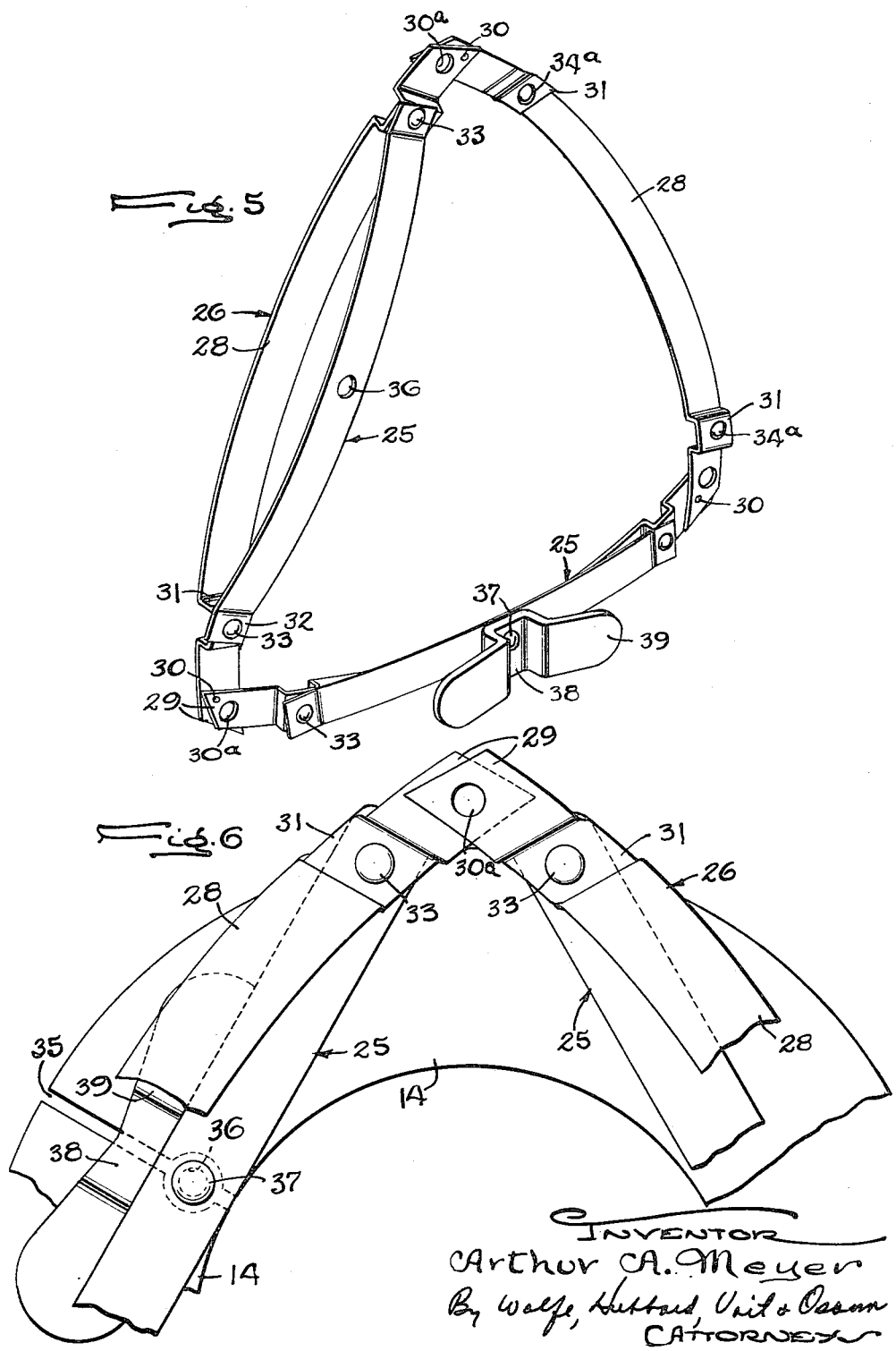

3,054,480
MOUNTING FOR MAGNETIC FRICTION ELEMENTS
Arthur A. Meyer, Beloit, Wis., assignor to Warner Electric Brake & Clutch Company, a corporation of Illinois
Filed Feb. 5, 1960, Ser. No. 6,915
7 Claims. (Cl. 188—164)

This invention relates to friction couplings in which a driving or retarding torque is derived by drawing magnet and armature rings into axial gripping engagement. More particularly the invention is concerned with a coupling of the type shown in Patent No. 1,944,831 in which one of the magnetic rings is supported for axially floating by means of a plurality of tangentially disposed leaf springs, the ring being urged into light continuous contact with the other ring.

The general object is to provide a new and improved construction and mounting of the supporting leaf springs which, as compared to the patented structure, is simpler, less susceptible to vibration noises, and reversible, that is, the leaf springs transmit torque in opposite directions of relative rotations between the magnetic rings.

A further object is to utilize the idle end portion of the leaf springs in a novel manner to damp out vibration and thereby eliminate noise incident to engagement of the coupling.

Still another object is to bow the leaf springs in a novel manner such as to derive an axially directed force for urging the supported ring axially and holding the same in light contact with the coacting element while the magnet is deenergized.

The invention also resides in the novel manner of prestressing the leaf springs to insure continuance of the biasing force.

Other objects and advantages of the invention will become apparent from the following detailed description taken in connection with the accompanying drawings, in which—

FIGURE 1 is a fragmentary sectional view of an electromagnetic friction brake embodying the novel features of the present invention.

FIG. 2 is a perspective view of a blank from which one of the supporting leaf springs is formed.

FIG. 3 is a side view of a completed leaf spring.

FIG. 4 is a fragmentary view of a part of FIG. 1 showing one leaf spring under stress.

FIG. 5 is a perspective view of the leaf spring assembly.

FIG. 6 is an enlarged plan view of a part of FIG. 5.

For purposes of illustration the invention is shown in the drawings incorporated in a magnetic pilot clutch for actuating a friction brake comprising a rotatable drum 10 and an expansible friction band 11 anchored on a plate 12. The pilot clutch includes an armature ring 14 concentric with the drum axis and supported on a flange 13 of the drum 10 for rotation therewith. It is adapted for axial gripping engagement with radially spaced pole faces 15 of a magnet ring 16 journaled on a bearing 17 and backed by a flange 18 on the anchor plate. The magnet is U-shaped in radial cross-section and cooperates with the armature to define a flux path 19 of toroidal shape enclosing a multiple turn annular winding 20.

When the winding is energized while the drum 10 is rotating in either direction, the armature is drawn against and coupled frictionally to the magnet which turns with the drum 10 through a short angular distance. In this motion a lug 21 acting on a roller on the free end of a lever 22 swings the latter to actuate a cam or other mechanism 23 for expanding the band to apply the brake. The pilot clutch then slips and holds the brake applied until the winding is deenergized to allow the part to be returned to released position by the return spring of the brake.

As in the patented construction, the armature ring 14 is supported by a plurality, three in the present instance, of thin leaf springs 25 angularly spaced around the ring and extending tangentially thereof between the back of the ring and a frame 26 clamped against the drum flange 13 by screws 27. In accordance with the present invention, the springs perform several new functions including the continuous biasing of the armature into light contact with the magnet face and the transmission of the pilot clutch torque in both directions of turning of the armature.

In general, such transmission of the opposite torques from the armature member 14 to the supporting member 26 is achieved by fastening opposite ends of each spring to one member and securing the spring intermediate its ends to the other member. The axially directed biasing force is achieved by a circumferential bowing of each spring and a novel prestressing of the same to insure continuance of the biasing force in spite of changes in the axial positions of the armature relative to its support initially or after wear in service use.

In the present instance, the frame 26 is generally a rigid polygon composed in this instance of three slightly curved flat strips 28 with the ends 29 overlapped as shown in FIGS. 5 and 6 and secured together by spot welds 30 adjacent holes 30ᵃ through which the clamping bolts 27 extend. Near their opposite ends, each strip is struck up as indicated at 31 to provide a raised flat surface against which opposite ends 32 of one leaf spring 25 are clamped and securely held in an axial plane by rivets 33 extending through holes 34 in the springs near the ends thereof and holes 34ᵃ in the bosses 31 of the bars 28 near the corners of the triangular frame 26. Herein, each of the leaf springs 25 comprises a strip of resilient spring steel about 0.75 inch wide and 0.024 of an inch thick preferably being composed of two or more laminations lying face to face as shown in FIG. 3. As shown in FIGS. 5 and 6, the rivets 33 are disposed near the outer periphery of the armature ring which herein is composed of three arcuate segments arranged end to end and separated by radial gaps 35. The frame strips 28 are of substantially lesser curvature than the armature segments so that holes 36 at the centers of the leaf springs are spaced inwardly from the strips. Rivets 37 extending through these holes and bosses 38 at the centers of metal straps 39 secure the latter flat against the springs. As shown in FIG. 6, the straps 39 are bent edgewise and opposite ends thereof are spot welded against the backs of the armature segments on opposite sides of the gaps 35. The riveting of the straps to the springs is facilitated by spacing the spring holes 36 inwardly from the strips 28.

The desired longitudinal bowing of the leaf springs 25 as illustrated in FIG. 1 to derive the axial biasing pressure is achieved by spacing the holes 34ᵃ in the supporting strips 28 somewhat closer together than the spacing of the holes 34 in the springs. Thus, when the springs are bent longitudinally enough to bring the holes 34 in the springs into register with the holes 34ᵃ in the bars 28, the springs will be bowed to the desired degree away from the strips and such bowing will be retained after inserting and setting of the rivets 33. With the springs thus bowed, the desired light axial pressure for holding the armature in contact with the magnet face will be produced by so spacing the flange 18 from the drum flange that the centers of the bow in the springs will be depressed slightly as shown in FIG. 1.

The invention also contemplates a novel prestressing of the leaf springs 25 so as to prevent reverse bowing of the springs by shifting the armature axially in a direction to carry the springs over-center with respect to the plane of the spring ends 32. For this purpose, the blank FIG. 2 from which each spring is formed is deformed as shown in FIG. 3 by bending up the short end portions 32 of the blank about transverse line 41 to set the metal permanently at the bends 42 and thus dispose the flat ends when the springs are free at an angle, for example 15 degrees, relative to the intervening part of the leaf spring proper. Now as an incident to bringing the bent up ends 32 back into a common plane and bowing of the intervening length of the spring as above described, the bends 42 will be stressed in a direction to resist depression of the bows even when the latter is shifted enough to carry the central part of the bow over center that is beyond the plane of the clamped ends 32.

It will be apparent that the armature, the leaf springs and the polygonal frame 26 form a unitary assembly which when fastened to the drum flange 13, locates the armature in the proper axial position. Then when the brake assembly is completed, the armature will be pushed into the drum a short distance thus depressing the centers of the spring bows as shown in FIG. 1 so as to derive the light axial pressure for holding the armature in continuous contact with the magnet. The flux circuit 19 is thus maintained closed while the magnet is deenergized.

While the brake is released and the drum turning in the direction indicated by the arrow in FIG. 4, the leaf springs will remain shaped as shown in FIG. 1. Now when the winding 20 is energized, the magnet will be coupled to the armature and turn therewith until the brake is fully applied. The torque for actuating the brake expander and maintaining the brake applied during slipping of the pilot clutch is sustained by the end portions 25$^a$ of the leaf springs 25, these being placed under tension between the rivets 33 and 37 and thus become straightened as shown in FIG. 4. Such straightening may be accompanied by an increased bowing of the opposite end portions 25$^b$ of springs somewhat as illustrated in FIG. 4.

The same action takes place when the magnet is energized to apply the brake with the drum rotating in the opposite direction. In this case and in view of the reversal of the torque transmitted by the magnetic clutch, the opposite end portions 25$^b$ of the leaf springs are placed under tension and straightened so as to sustain the brake actuating torque. As before, the end portions 25$^a$ are compressed endwise and thus bowed to an increased degree.

In both directions of turning of the drum and when the brake is released or applied, it will be observed that the armature mounting is free of rubbing friction and is adapted to float axially as required to accommodate wobbling of the drum, such floating being permitted by lateral flexure of the leaf springs. In all such positions, the armature is urged axially by the bowed springs and held under the desired pressure against the magnet face.

The leaf springs mounted as above described perform still another distinctly new and important function namely the exertion of a damping action which greatly reduces noise incident to the vibration which develops upon gripping engagement of friction surfaces under heavy pressure. This damping action is believed to be attributable to the relaxed condition of the idle end portions of the leaf springs when the opposite ends are under tension and sustaining the actuating torque. At this time, the vibration originating at the friction faces is transmitted through the straps 39 to the idle end portions of the leaf springs which are bowed and relatively free so as to possess a substantially different natural frequency than the remaining structure then under heavy stresses. These idle parts thus resist vibrations of the connected parts thereby damping out the noise producing vibrations or changing same to an inaudible frequency.

It has been found that the efficacy of the damping action above described may be augmented by laminating the leaf springs 25. Two such laminations are illustrated although the use of a larger number may be desirable in order to substantially eliminate noise in some pilot clutch or brake structures.

I claim as my invention:

1. In a magnetic friction device, the combination of, a ring of magnetic material having a friction face adapted for gripping engagement with a coacting element to derive a friction torque, a support axially spaced from the back of said ring, a flexible strip of resilient material extending tangentially across the back of said ring, said strip when free having opposite short end portions bent up and inclined relative to a flat interventing portion of the strip, means clamping said end portions flat against said support whereby to bow said interventing portion toward said ring, and means fixedly securing said ring to said strip midway between the ends of the latter, opposite end portions of said strip being placed under tensions in response to the exertion of oppositely directed torques on said friction face.

2. In a magnetic friction device, the combination of, a ring of magnetic material having a friction face adapted for gripping engagement with a coacting element to derive a friction torque, a support axially spaced from the back of said ring, a flexible strip of resilient material extending tangentially across the back of said ring, means fixedly securing said ring to said strip at a point intermediate the ends of the latter, said strip being flat when the ends thereof are free, and means fixedly securing the ends of said strip to more closely spaced points on said support whereby to bow the strip toward said ring and adapt the same to resist axial movement of the ring toward said support, opposite end portions of said bowed strip being placed under tension in response to the exertion of oppositely directed torques on said friction face.

3. A magnetic friction device as defined by claim 2 in which said resilient strips are prestressed adjacent their ends to maintain the initial direction of bowing of the stress in spite of axial shifting of said ring.

4. In a magnetic friction device, the combination of, a supporting member, a ring-like armature member of magnetic material axially spaced from said supporting member and providing an axially facing friction face, an elongated resilient leaf spring disposed between said members and extending generally tangentially across the back of said armature member, means securing said strip intermediate its ends to one of said members and means fixedly securing spaced points at opposite ends of the spring to the other of said members at more closely spaced points whereby to bow the opposite end portions of the spring away from said one member.

5. In a magnetic friction device, the combination of, a ring of magnetic material, a plurality of elongated bars overlapped and secured together at their ends to form a rigid polygon, a plurality of leaf springs extending generally tangentially of said ring and disposed between the latter and said polygon, means fixedly securing said ring to said strip intermediate the ends of the latter, and means fixedly securing the ends of said springs to more closely spaced points on said polygon whereby to bow said springs toward said ring and adapt the same to resist axial movement of said ring toward said support.

6. A friction device as defined by claim 5 in which said securing means between said springs and said bars are near the corners of said polygon.

7. A friction device as defined by claim 5 in which the inner periphery of said ring is spaced inwardly from the centers of said bars and the ring and the means securing said ring and said leaf springs together are radially spaced inwardly from said bars.

References Cited in the file of this patent

UNITED STATES PATENTS

| | | |
|---|---|---|
| 1,407,777 | Wright | Feb. 28, 1922 |
| 1,844,122 | Hoddy et al. | Feb. 9, 1932 |
| 1,925,956 | Easter | Sept. 5, 1933 |
| 2,068,654 | Cadman | Jan. 26, 1937 |
| 2,764,265 | Runner | Sept. 25, 1956 |